(12) United States Patent
Esiner et al.

(10) Patent No.: US 12,177,336 B2
(45) Date of Patent: Dec. 24, 2024

(54) SECURITY DEVICE AND METHOD OF PROVENANCE VERIFICATION

(71) Applicant: Illinois at Singapore Pte Ltd, Singapore (SG)

(72) Inventors: Ertem Esiner, Singapore (SG); Binbin Chen, Singapore (SG); Daisuke Mashima, Singapore (SG); Zbigniew Kalbarczyk, Singapore (SG); David M. Nicol, Singapore (SG); Wei Lin, Singapore (SG)

(73) Assignee: Illinois at Singapore Pte Ltd, Singapore (SG)

( * ) Notice: Subject to any disclaimer, the term of this patent is extended or adjusted under 35 U.S.C. 154(b) by 340 days.

(21) Appl. No.: 17/769,967

(22) PCT Filed: Oct. 16, 2020

(86) PCT No.: PCT/SG2020/050593
§ 371 (c)(1),
(2) Date: Apr. 18, 2022

(87) PCT Pub. No.: WO2021/076057
PCT Pub. Date: Apr. 22, 2021

(65) Prior Publication Data
US 2022/0417002 A1     Dec. 29, 2022

(30) Foreign Application Priority Data

Oct. 18, 2019    (SG) .............................. 10201909717P

(51) Int. Cl.
*H04L 9/08*    (2006.01)
*H04L 9/32*    (2006.01)

(52) U.S. Cl.
CPC ............ *H04L 9/085* (2013.01); *H04L 9/0866* (2013.01); *H04L 9/3242* (2013.01); *H04L 9/3297* (2013.01)

(58) Field of Classification Search
CPC ..... H04L 9/085; H04L 9/0866; H04L 9/3242; H04L 9/3297; H04L 9/0861;
(Continued)

(56) References Cited

U.S. PATENT DOCUMENTS 9,794,753 B1 * 10/2017 Stitt ...................... H04W 12/06
2006/0182277 A1 * 8/2006 Sandhu ................. H04L 9/3297
380/44
(Continued)

FOREIGN PATENT DOCUMENTS

WO    2018/147673 A1    8/2018
WO    2018/230147 A1    12/2018

OTHER PUBLICATIONS

Esiner E. et al., 2019 IEEE International Conference on Communications Control, and Computing Technologies for Smart Grids (SmartGridComm), Oct. 23, 2019 [Retrieved on Feb. 2, 2021] <DOI: 10.1109/SMARTGRIDCOMM.2019.8909712>.

(Continued)

*Primary Examiner* — J. Brant Murphy
(74) *Attorney, Agent, or Firm* — Knobbe, Martens, Olson & Bear, LLP

(57) ABSTRACT

A method of provenance verification comprises providing a plurality of security devices, each security device being provided with a key set comprising: a secret key, and a plurality of shared keys, each shared key being derived by generating a hash of the secret key and a salt value that is specific to a pair consisting of said security device and another of the plurality of security devices. The method also comprises configuring each security device to: generate (Continued)

and/or receive one or more messages; and perform at least one cryptographic operation on the message or messages, and/or on data derived therefrom, using a respective secret key of the security device and/or one of said shared keys.

17 Claims, 9 Drawing Sheets

(58) Field of Classification Search
CPC ....... H04L 9/0894; H04L 9/14; H04L 9/3239; Y04S 40/20; G06F 21/602; G06F 21/64; H04W 12/069
See application file for complete search history.

(56) References Cited

U.S. PATENT DOCUMENTS

| | | | | |
|---|---|---|---|---|
| 2006/0182283 | A1* | 8/2006 | Sandhu | H04L 9/0825 380/286 |
| 2010/0131756 | A1* | 5/2010 | Schneider | H04L 63/068 380/44 |
| 2012/0039474 | A1* | 2/2012 | Ho | H04L 9/0844 380/278 |
| 2012/0089519 | A1* | 4/2012 | Peddada | H04L 9/3297 713/169 |
| 2016/0142205 | A1* | 5/2016 | Mohan | H04L 9/0872 380/44 |
| 2018/0375870 | A1* | 12/2018 | Bernsen | H04L 63/10 |
| 2019/0349189 | A1* | 11/2019 | Bodlaender | H04L 9/083 |

OTHER PUBLICATIONS

Zhou L. et al., A scheme for lightwegith SCADA packet authentication. 2017 23rd Asia-Pacific Conference on Communications (APCC), Dec. 13, 2017 [Retrieved on Feb. 2, 2021] <DOI: 10.23919/APCC.2017.8304051>.

Sultana S. et al., A Lightweight Secure Provenance Scheme for Wireless Sensor Networks. 2012 IEEE 18th International Conference on Parallel and Distributed Systems, Dec. 19, 2012 [Retrieved on Feb. 2, 2021] <DOI: 10.1109/ICPADS.2012.24>.

Liang X. et al., ProvChain: A Blockchain-based Data Provenance Architecture in Cloud Environment with Enhanced Privacy and Availibility, 2017 17th IEEE/ACM International Symposium on Cluster, Cloud and Grid Computing (CCGRID), May 17, 2017 [Retrieved on Feb. 2, 2021] <Doi: 10.1109/CCGRID.2017.8>.

International Search Report for PCT Application No. PCT/SG2020/050593, dated Feb. 5, 2021, in 4 pages.

Written Opinion for PCT Application No. PCT/SG2020/050593, dated Feb. 5, 2021, in 6 pages.

* cited by examiner

Algorithm IV.1: Provenance Verification

Data: h, ts, messages, $numberOfNodesOnThePath$
Result: accept/reject

1  $h'_0$ = hash($AT_{source}$, ts, messages[0])
2  c = 1
3  sourceCounter = 0
4  while c++ ≤ $numberOfNodesOnThePath$ do
5      if $Witness_c$ is another source then
6          sourceCounter++
7      $h'_c$ = hash($h'_{c-1}$, $AT_c$, ts, messages[0 : sourceCounter])
8  if $h'_c$ = h then
9      accept
10 else
11     reject

Figure 3

| Notation | Description |
| --- | --- |
| $sk_i$ | A secret key that belongs to a node $i$, $i \in \{0, 1, \ldots, n\}$ where $i = 0$ refers to the source and $n$ is the destination. |
| $\kappa$ | The security parameter |
| $AT$ | The authentication token. It is subscripted to denote its "from" and "to" (s.a., $AT_{SD}$ to denote it is the authentication token that servers between the source, $S$, and the destination $D$). |
| $h$ | The Cryptographic evidence every node prepares when they initiate, witness or extend a message. $h_i$ is the cryptographic evidence for the $i^{th}$ node on the path of the message. To denote a cryptographic evidence's "from" and "to", we use the same notation with $AT$, where $h_{SD}$ means the cryptographic evidence from $S$ to $D$. |
| $S, W, D$ | The source, witness and destination node IDs, respectively. |
| $ts, msg$ | A timestamp, a message. |
| $MSG$ | A set of messages. When a message is initiate by a source, if it is extended by any downstream node, the new message is added to this set. |
| $\mathcal{A}$ | The blackbox PPT adversary. |
| $\mathcal{HC}$ | The hash challenger. |
| $\mathcal{C}$ | The challenger in the proof that plays the role of the destination node and the honest nodes. It uses the output of $\mathcal{A}$ to win against $\mathcal{HC}$, which means to break the security assumption. |
| $\mathcal{B}$ | $\mathcal{B}$ plays the role of $\mathcal{C}$ against $\mathcal{A}$ and acts as the adversary to $\mathcal{HC}$. |
| $\mathcal{HN}, \mathcal{MN}$ | The sets of honest nodes and the malicious nodes |

SECURITY DEVICE AND METHOD OF PROVENANCE VERIFICATION

TECHNICAL FIELD

The present disclosure relates generally to the field of cybersecurity, for example in the context of smart grid systems.

BACKGROUND

Industrial control systems (ICS), including smart power grids, are critical for the daily operation of modern society. Over the past decade, cybersecurity attacks have become a major risk factor faced by smart grid operators. Many successful attacks, such as Stuxnet and the Ukraine power grid attacks, exploited the deficiency of checking for monitoring and control in the cyber infrastructure of the smart grid. For example, the success of CrashOverride malware used in the Ukraine incident in 2016 resulted from the fact that there were field devices that execute malicious commands without checking whether those were issued by the right user from the right source under the right context.

Very often in systems such as smart grids, only basic encryption is used and only a single signature is checked. This allows an attacker to steal a single key to bypass the checking. State-of-the-art ICS protection mechanisms introduce security appliances, such as application-layer firewalls, intrusion detection systems and the like, along a message's expected transmission path. These middle boxes add more security checking points. However, there is no checking at a destination device to ensure that the messages have indeed gone through the right network paths (and hence, have undergone all necessary mediations and scrutinies) before reaching the destination. As a result, an attacker can launch an attack from another source point (e.g., a node impersonating a SCADA master system) that bypasses all these en-route defence mechanisms.

In view of these threats, for example in the context of smart grids, it is desirable to introduce provenance checking as an additional security measure. However, implementation of provenance checking in a latency-stringent ICS like a power grid presents challenges. Firstly, some time-critical packets in smart power grids need to be delivered in as little as 2 milliseconds. This has caused difficulty in implementing public key cryptography in security standards such as IEC 62351. Secondly, there is a need for flexibility in any message authentication scheme, since even within standards-compliant smart grid systems, a number of different communication models need to be supported. Specifically, some of the communication involves multiple hops (e.g., firewall, substation gateway, etc.) between the control center and intelligent electronic devices (IEDs), while the automated control within a substation may be a single-hop communication.

More generally, there is a need to provide a means for provenance checking within networked systems that have stringent latency limits, and where multi-hop communication may be required between devices in the system.

SUMMARY

In a first aspect, the present disclosure relates to a security device for provenance verification, the security device comprising:
at least one processor; and
machine-readable storage having stored thereon:
a secret key;
a plurality of shared keys derived from the secret key, each shared key being associated with a pair consisting of the security device and one of a plurality of other security devices; and
instructions for causing the at least one processor to:
generate a message, and/or receive a message from a device with which the security device is in communication, or from one of the plurality of other security devices; and
perform at least one cryptographic operation on the message, and/or on data derived from it, using the secret key and/or one of said shared keys.

In some embodiments, each shared key is derived by generating a hash of the secret key and a salt value that is specific to the pair.

In a second aspect, the present disclosure relates to a method of provenance verification, comprising:
providing a plurality of security devices, each security device being provided with a key set comprising: a secret key, and a plurality of shared keys, each shared key being derived by generating a hash of the secret key and a salt value that is specific to a pair consisting of said security device and another of the plurality of security devices; and
configuring each security device to:
generate and/or receive one or more messages; and
perform at least one cryptographic operation on the message or messages, and/or on data derived therefrom, using a respective secret key of the security device and/or one of said shared keys.

The at least one cryptographic operation may comprise generating at least one hash from one or more of: the secret key, one or more of said shared keys, one or more of said salt values, the message, and a timestamp.

The at least one cryptographic operation may comprise one or more of: an initiate operation that generates cryptographic evidence for the message; a witness operation that alters cryptographic evidence that is already attached to the message; an extend operation that alters cryptographic evidence that is already attached to the message, and that also modifies the message; and a verify operation that checks the authenticity of the cryptographic evidence.

In some embodiments, the initiate operation comprises:
determining a destination device of said other security devices to which the message will be sent;
generating cryptographic evidence that comprises a hash of: the shared key of the pair consisting of the security device and the destination device; a timestamp value; and the message; and
transmitting the cryptographic evidence, the timestamp value, and the message to the destination device.

In some embodiments, the witness operation comprises:
receiving a cryptographic evidence, a timestamp, and the message from a first device of said other security devices;
determining a second device of said other security devices to which the message will be sent;
generating a modified cryptographic evidence comprising a hash of the cryptographic evidence, the shared key of the pair consisting of the security device and the second device, the timestamp, and the message; and
transmitting the modified cryptographic evidence, the timestamp, and the message to the second device.

In some embodiments, the extend operation comprises:
receiving a cryptographic evidence, a timestamp, and the message from a first device of said other security devices;

determining a second device of said other security devices
to which the message will be sent;
generating a modified cryptographic evidence comprising
a hash of the cryptographic evidence, the shared key of
the pair consisting of the security device and the
destination device, the timestamp, the message, and a
further message; and
transmitting the modified cryptographic evidence, the
timestamp, the message, and the further message to the
second device.

In some embodiments, the verification operation comprises:
receiving a cryptographic evidence, a timestamp, and one
or more messages, said one or more messages arriving
at the security device through a sequence of said other
security devices;
generating a hash for each successive device in the
sequence, each successive hash being computed based
on: the hash for the previous device in the sequence, the
shared key for the pair that consists of the successive
device and the previous device, the timestamp, and if
applicable, one of the one or more messages; and
comparing a last one of said hashes to the cryptographic
evidence.

In some embodiments, the method comprises connecting
the security devices to a network such that the security
devices intercept or otherwise obtain traffic between a plurality of connected devices on the network, wherein the one
or more messages comprise data derived from said traffic.

In some embodiments, the network is a network of an
industrial control system or a smart grid.

In a third aspect, the present disclosure relates to a
security system for a network of connected devices, the
security system comprising:
a plurality of security devices attachable to the connected
devices, each security device being provided with a key
set comprising: a secret key, and a plurality of shared
keys, each shared key being derived by generating a
hash of the secret key and a salt value that is specific to
a pair consisting of said security device and another of
the plurality of security devices;
wherein each security device is a security device as
disclosed herein, and/or is configured to perform a
method as disclosed herein.

In a fourth aspect, the present disclosure relates to a
networked system comprising:
a plurality of connected devices;
wherein a subset of the connected devices is a plurality of
security devices, each security device being provided
with a key set comprising: a secret key, and a plurality
of shared keys, each shared key being derived by
generating a hash of the secret key and a salt value that
is specific to a pair consisting of said security device
and another of the plurality of security devices;
wherein each security device is a security device as
disclosed herein, and/or is configured to perform a
method as disclosed herein.

In some embodiments, the networked system is an industrial control system or a smart grid.

BRIEF DESCRIPTION OF THE DRAWINGS

Some embodiments of devices and methods for message
authentication, in accordance with present teachings will
now be described, by way of non-limiting example only,
with reference to the accompanying drawings in which:

FIG. 3 shows an algorithm for provenance verification in
a method of message validation;
FIG. 4 shows notation used in the present disclosure.

DETAILED DESCRIPTION

In general terms, embodiments of the present disclosure
provide a solution for fast and flexible message authentication that supports provenance verification. In some embodiments, security devices may be implemented as bump-in-the-wire (BITW) devices in various types of industrial
control systems without requiring major changes in existing
devices or infrastructure. For example, a BITW device may
be implemented in an intrusive (serial) manner, in which it
intercepts traffic in the network, or in a non-intrusive (parallel) manner, in which it does not intercept traffic, but
merely receives a copy of a message for monitoring and
provenance verification purposes. In other embodiments, the
message authentication protocol of the present disclosure
may be implemented natively in connected devices in a
networked system, for example as software or firmware or
a combination of these.

Specifically, by using a lightweight hash-chaining-based
method that supports provenance verification, instead of
computationally intensive public-key cryptography,
embodiments of the present disclosure achieve less than 2
milliseconds end-to-end proving and verifying delay for
time-stringent applications such as in a typical smart grid
communication model, when implemented on low-cost
embedded devices.

Figure 1:
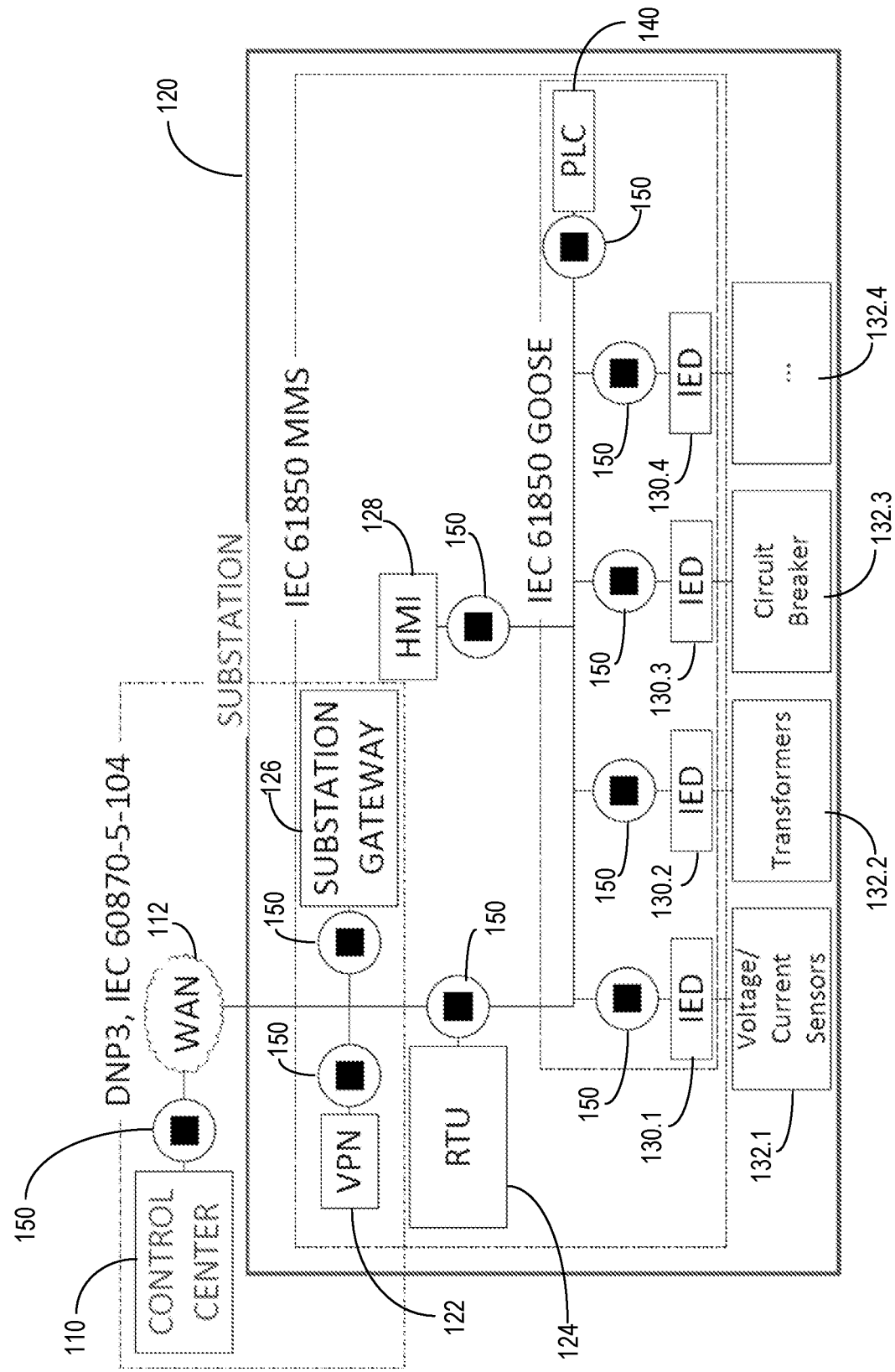
FIG. 1 is an example architecture of a system of connected devices.

FIG. 1 shows an example of a system 100 of connected
devices in which embodiments of the present disclosure may
be implemented. The example illustrated in FIG. 1 is a smart
grid system in which a plurality of security devices are connected as BITW devices. However, it will be understood that this is simply illustrative and not limiting. Embodiments may be implemented in a number of other contexts, and implementations need not be via BITW (intrusive or non-intrusive) devices, but could instead be via software or firmware as mentioned above. Accordingly, it will be understood in the discussion below that a "security device" may itself be one of the connected devices of the system 100, or be incorporated into one of the connected devices of the system 100 (e.g., via one or more hardware, software and/or firmware components).

The system 100 may be a smart grid system, for example. A smart grid system 100 may include a control centre 110 and multiple (possibly thousands of) substations in the field. For clarity and ease of explanation, FIG. 1 shows a single substation 120, connected to the control centre 110 via wide-area network (WAN) 112, but it will be appreciated that many such substations may be connected to the control centre 110.

As shown in FIG. 1, the substation 120 may use standardised technologies like IEC 60870-5-104 or DNP3.0 for telecontrol and IEC 61850 for substation automation.

Within the substation 120, intelligent electronic devices (IEDs), four examples 130.1 to 130.4 of which are shown, serve as the communication end points. They are responsible for operating on physical power system devices. For example, IED 130.1 operates on one or more voltage/current sensors 132.1, IED 130.2 operates on one or more transformers 132.2, and IED 130.3 operates on one or more circuit breakers 132.3. Realtime communication among the IEDs is crucial for automated protection.

The substation 120 also includes one or more Programmable Logic Controllers (PLCs) 140. PLCs 140 are in charge of automated control based on various power grid measurements. The substation 120 also includes a substation gateway 126 that may perform protocol translation, e.g., between IEC 60870-5-104 and IEC 61850. Substation 120 may also include a human machine interface (HMI) 128 that enables a human operator to observe, and potentially manually override, the operation of individual components of the substation 120, such as actuators or other process control devices. Further, substation 120 may include one or more remote terminal units (RTUs) 124 that acquire data from, and transmit control signals to, components such as PLC 140 and IEDs 130.1 to 130.4. In order to enable remote maintenance, by grid operators or device vendors, virtual private network (VPN) devices 122 connected to the public network 112 may also be deployed.

Each of the connected devices (IEDs 130.1-130.4, PLC 140, VPN 122, RTU 124, substation gateway 126, HMI 128) of the substation 120 may be considered to be a communication node of the system 100, since each is capable of receiving data from, and/or transmitting data to, at least one other connected device in the system 100. In some embodiments, at least a subset of connected devices may themselves be security devices. For example, connected devices such as RTU 124 or HMI 128 may be configured as security devices that receive network traffic passing from other connected devices, and apply one or more cryptographic operations to data derived from the network traffic, according to methods disclosed herein. Where a connected device, such as IED 130.1, does not itself have cryptographic functionality, a security device 150 may be attached thereto, or may otherwise be placed in a communication path between the IED 130.1 and other connected devices in the system 100, such that messages originating at the IED 130.1 can be used by the security device 150 to generate cryptographic evidence to verify the provenance of the messages.

A smart grid system such as the system 100 may implement a variety of communication models, some of which involve only a single hop between a source and a destination. For example, in IEC 61850-compliant substations, Status Update in Substation, Automated Control in Substation, and Protection to Switchgear are done using the IEC 61850 GOOSE (Generic Object Oriented Substation Events) protocol. These are publisher-subscriber-type communications using multicast. In other cases, multiple entities (hops) are involved. For instance, in SCADA Control/Monitoring, commands from a control centre to a field device in a low-voltage substation may be mediated by devices in a high-voltage substation. Note that, for such communications, when protocol translation is involved, the substation gateway 126 may work as a source of the translated messages.

Another complicated communication model is the Reporting by Field Devices, where measurements from PLCs 140 or IEDs 130.1 to 130.4 are first sent to the substation gateway 126 or RTU 124, which may perform protocol translation and/or message aggregation before forwarding them.

The latency requirements specified by public guidelines such as those provided by IEEE and the US Department of Energy vary depending on the use case. Of note, communication within substations has very stringent delivery latency requirements. In particular, Protection to Switchgear requires very short latency (below 2 ms according to IEEE guidelines).

To counter attacks mounted at various places, it is crucial to authenticate the source and integrity of messages. Protection of this type can be realised by making a sender sign the message to ensure integrity and authenticity. Checking of message delivery path is equally as important. When an attacker steals some authorised source's credential and tries to insert a message via an alternative path (e.g., from malware on a field device), verification of the message delivery path allows the destination to block such attacks. In particular, the path verification checks whether a message has gone through the expected set of nodes (i.e., verifying who has witnessed the message).

For example, when a message has gone through a well-protected high-voltage substation system, downstream nodes can regard the messages as being trusted. Since the network topology of an ICS is not dynamic, such paths are predetermined and can be used for policy checking. In addition, it is often the case where conversion of messages, such as protocol translation, is involved. In such a case, to detect misbehaving nodes, knowing who performed the conversion and also how the message is modified helps decision-making. Such information allows the destination to check if, for example, the conversion is performed by a legitimate protocol translator.

Accordingly, embodiments of the present disclosure provide devices, methods and systems for securing systems of connected devices, based on the concept of provenance. Specifically, embodiments may provide a method for checking the authenticity of the message source and verifying the end-to-end message delivery path (i.e., which nodes are involved and in what order) as well as message transformation en route.

A plurality of security devices that implement the method may be provided in the system 100 of connected devices. For example, in some embodiments, each key communication node (e.g., a SCADA master, IEDs, PLCs, substation gateways, etc.) may have a security device 150 connected thereto, as shown in FIG. 1, such that all messages (or copies thereof) that are sent or received by the key communication nodes of the system 100 are intercepted (or otherwise obtained) by a security device 150 that implements the security method. In other embodiments, security devices 150 may be attached only at critical junctures of the system 100, i.e. may not be attached directly to one of the connected devices, but may be placed at points of the network so that they can intercept or otherwise obtain network traffic to generate cryptographic evidence that can be used for provenance verification by other security devices 150 that are "downstream" along the communication path. The placement and functionality of the security devices 150 enables systematic verifiability of the provenance information as will be described in further detail below. In some embodiments, one or more of the key communication nodes themselves may perform the functions of security devices 150.

In some embodiments, transparent, bump-in-the-wire (BITW) devices 150 can be incorporated into existing systems 100. Accordingly, in such example implementations, while legacy, existing ICS devices can send and receive messages in an as-is manner, added BITW devices 150 intercept or otherwise obtain messages and provide extra protection and verification without affecting the endpoints. For example, a BITW device 150 may be connected in series with two connected devices, such that a message passing from a first connected device to a second connected device is intercepted by the BITW device 150 such that the BITW device 150 may perform one or more cryptographic operations on the message before it reaches the second connected device. In another example, a BITW device 150 may be connected in parallel, such that the message passes from the first to the second connected device as normal, but a copy of the message also passes to the BITW device 150 for performing one or more cryptographic operations thereon.

In some embodiments, a security device 150 at the sender side intercepts (or otherwise obtains, e.g. by receiving copies of messages) and "wraps" messages for additional security, and a security device 150 at the receiver side performs verification and security policy enforcement (e.g. based on provenance information) and then "unwraps" and forwards the original message to the target device. In other embodiments, cryptographic evidence may be generated by the sender device itself, and verified by the target device itself.

For example, with reference to FIG. 1, IED 130.1 may transmit messages to RTU 124 that contain data relating to operation of voltage/current sensors 132.1, during normal operation of the substation 120. In this example, the IED 130.1 is the sender device and the RTU 124 is the target device. In some embodiments of the present disclosure, the IED 130.1 and RTU 124 each have a security device 150 connected thereto. In some embodiments, the functionality of a security device 150 may be incorporated into the RTU 124 (e.g., via software or firmware installed on the RTU 124). The security device 150 connected to IED 130.1 intercepts or otherwise obtains the message from IED 130.1 (or a copy thereof) and performs one or more cryptographic operations on it (or on data derived from it). The one or more cryptographic operations generate cryptographic evidence that can be used by the security device 150 that is attached to (or part of) RTU 124 to perform verification and security policy enforcement, forwarding the message to the RTU 124 if these checks are successful.

In some embodiments, the system 100 may include a redundancy mechanism to handle possible failures of security devices 150. For example, in existing deployments of smart grids, a critical smart grid device often has a hot standby system, and/or itself may have multiple network interfaces. Accordingly, redundant security devices 150 can be connected to the hot standby devices and to each of the standby interfaces of a critical device. Hence, the failure of a single security device 150 can be tolerated. The degree of redundancy may be decided based on the criticality of the associated smart grid devices. Such an architecture may also include a watchdog mechanism that monitors the availability of the security devices 150, e.g., based on timeout, to enable automated fail-over. For example, the watchdog mechanism may be implemented at control centre 110 and/or within individual substations 120.

Mediation by security devices 150 can be done selectively based on, for example, types of messages, nature of the target devices, and so forth. In this way, the security devices may be configured to have minimal impact on system throughput.

To meet the stringent latency requirements mentioned above, when a security device 150 initiates or verifies a message, public-key based solutions such as DSA and RSA cannot be used. Accordingly, embodiments of the present disclosure are based on preshared symmetric keys. The pre-shared symmetric keys are derived for each pair of source and destination nodes. While each node keeps a secret key for itself, it shares a derived key (each of which is called an authentication token—AT) with every node that is a possible destination for messages sent by it. To avoid confusion with public-key based signatures, the present disclosure will use the term "generating cryptographic evidence" instead of "signing".

A node is referred to as a "witness" when a message passes through it. A witness may conduct a cryptographic operation comprising a hash calculation to endorse that it sees the message. On the other hand, when a message is modified (e.g., because of protocol translation) in an intermediate node, the corresponding security device 150 attached to the intermediate node needs to extend the message. The content of a message can be a command, information, a caveat (e.g., regarding authorisation information), or all of them. If the network topology is not known to the security device 150 (referred to herein as the destination device) attached to (or otherwise associated with) the destination node, part of the message content may be a list of nodes involved, to which all the nodes on the path should add their identifier. Even though the destination device 150 knows all of the ATs by virtue of the pre-sharing process, fast verification can be achieved if it is provided with the order in which to use them. The destination device can verify the source (the sender) and all the witnesses between the source and the destination. In some cases, there can be two or more source or destination nodes on a message delivery path to support advanced smart grid communication models as will be described below.

The security method according to embodiments of the present disclosure comprises execution, by one or more security devices, of one or more of a tuple of algorithms, referred to herein as Setup, Initiate, Witness, Extend, and Verify. Setup creates the keys and authentication tokens and distributes them. Initiate generates cryptographic evidence for a message that has been sent by the physical device that the security device 150 is attached to, or a message that is generated by the security device 150 (where the physical device and the security device 150 are the same entity).

Witness alters the cryptographic evidence that is already attached to a message that is passing though the physical device that the security device 150 is attached to, or through the security device 150. Extend is similar to Witness, but also includes modification of the message. The security device 150 also alters the cryptographic evidence accordingly. Finally, Verify checks the authenticity of the cryptographic evidence and either accepts or rejects it.

Figure 2A:
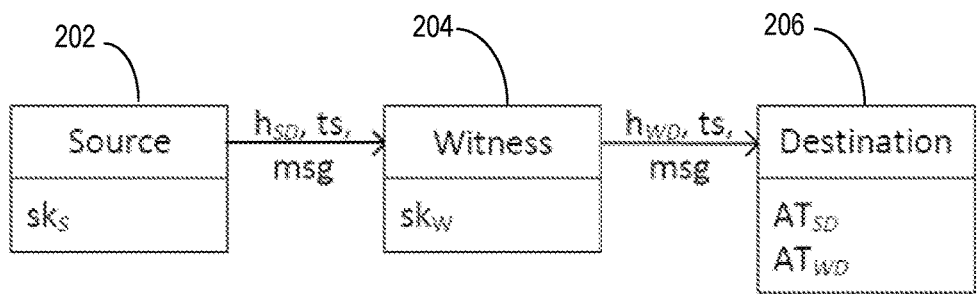
FIG. 2A shows a message flow in an example application
of a method of message validation in a system of connected
devices.

FIG. 2A shows a first example application of the security method in a protocol with 2 hops, in which a source node 202 sends a message msg to a destination node 206 via a witness 204. In FIG. 2A, each of the source 202, witness 204 and destination 206 has a security device 150 attached thereto to implement the security method, and in the following discussion, where references are made to cryptographic operations being performed by any of these nodes, it will be evident that these references are to cryptographic operations being performed by the security devices 150 attached thereto. The aim is to allow the sender 202 to prove its identity and message integrity to the destination 206 with minimal overhead in terms of time added to the original protocol. Note that, although destination in this example means an immediate neighbour in the network topology, in general, it refers to the eventual recipient of the message.

The source 202 possesses a secret key (sks) and the destination 206 stores an authentication token ($AT_{SD}$=hash (sks, $salt_{SD}$)) that has been generated by the source node 202. The authentication request, which proves identity to the destination 206, is a cryptographic evidence ($h_{SD}$=hash(hash (sks, $salt_{SD}$), ts)) of a message with no content. The salt value for the hash is associated with a particular destination node since there may be more than one possible destination node. The salt value is a randomly generated value that either can be stored or recreated on the fly. To prevent replay attacks, the evidence may be time-bound. Hence, to send the authentication request, the source 202 adds a timestamp (ts) to the hash computation.

To authenticate a message along with its identity, the source 202 performs an initiate operation comprising adding the message content (msg) to $AT_{SD}$, resulting in: $h_{SD}$=hash (hash (sks, $salt_{SD}$), ts, msg). The message is protocol/syntax agnostic and works as long as it is deserialised in the same way at both ends. For verification in the absence of the witness 204, source 202 transmits the message and the hash hso to the destination 206 so that the destination 206 can perform a verification operation. The verification operation comprises the destination 206 adding the timestamp and the message to its stored authentication token corresponding to source 202 (h'=hash ($AT_{SD}$, ts, msg)), and checking two things—if the timestamp is fresh, and if h' equals the received $h_{SD}$.

The above example, where the source 202 transmits the message directly to the destination 206, covers some single-hop communication models, such as Automated Control in Substation, Status Update in Substation, Protection to Switchgear, and Local Maintenance.

As mentioned above, many smart grid communication models involve multi-hop communication. In some such cases, a message is received by an intermediate node and then simply forwarded to the destination. For example, in a Remote Maintenance scenario, a VPN interface may serve in this way. In another example, in a SCADA Control/Monitoring case, the high-voltage substation may also be simply forwarding information. In these examples, a security device connected to the VPN interface or the high-voltage substation may act as a witness 204. Accordingly, in these scenarios as shown in FIG. 2A, the destination 206 has two ATs: one for the source node 202 and the other for the witness node 204 ($AT_{WD}$=hash ($sk_W$, $salt_{WD}$)).

The source node 202 performs an initiate operation to initiate the chain, by generating and sending $h_{SD}$ (as above) as cryptographic evidence to the witness node 204. The witness node 204 then naively needs to add its own cryptographic evidence to the message with the same timestamp so that when the destination 206 receives the message with two cryptographic evidences, it can verify that the message passed through the witness node 204. However, the more witness nodes on the path, the bigger the message becomes with the addition of cryptographic evidence on the path. Accordingly, a witness operation performed by the witness node 204 may comprise the witness node 204 deriving its cryptographic evidence in a nested manner using the cryptographic evidence from the source node 202 (or from the previous witness if it is not the first witness) so that it is used as a second key for its witness cryptographic evidence. That is, the hash computed by the witness node 204 is $h_{WD}$=hash ($h_{SD}$, hash ($sk_W$, $salt_{WD}$), ts, msg).

This way, the next witness cannot generate the cryptographic evidence for the initial message from the source and cannot craft the message in a way that it never passed from a previous witness either. A verification operation at the destination 206 is then performed by calculating the nested hash values from the first one to the last (there are only two in this example). Also, the verification operation comprises only checking if the last hash h' is equal to the received cryptographic evidence:

$$h'_0 = \text{hash}(AT_{SD}, ts, \text{msg});$$

$$h'_1 = \text{hash}(h'_0, AT_{WD}, ts, \text{msg}).$$

For verification, the destination 206 calculates the chain to see if it can recalculate the received cryptographic evidence (h), which is the cryptographic evidence from the last intermediary (or the source 202 if there is no intermediary) to the destination 206. The verification loop is shown in Algorithm IV.1 in FIG. 3.

While the Initiate and Witness algorithms' complexities are both constant (O(1)), the complexity of the verification algorithm is linear in the number of intermediaries (O(N), where N is the number of intermediaries). This makes the overall proof and verify complexity of one packet traverse O(N). In the naive approach where all upstream nodes prove provenance to the downstream nodes, the complexity is $O(N^2)$, which highlights the efficiency of the present embodiment.

In some embodiments, a cryptographic operation performed by one or more security devices may comprise an extend operation. For example, in SCADA Monitoring/Control, it is often the case that protocol translation is performed en route, for example, from IEC 60870-5-104 to IEC 61850 MMS at a substation gateway. In such a case, the destination node 206 may require verification of by whom the transformation is performed, and consistency between the two messages (before and after translation). In this example, the SCADA master is regarded as a source for the IEC 60870-5-104 message while the substation gateway works as another source for the IEC 61850 MMS message. From the receivers' perspectives, the complete provenance should include verification on both paths.

Figure 2B:
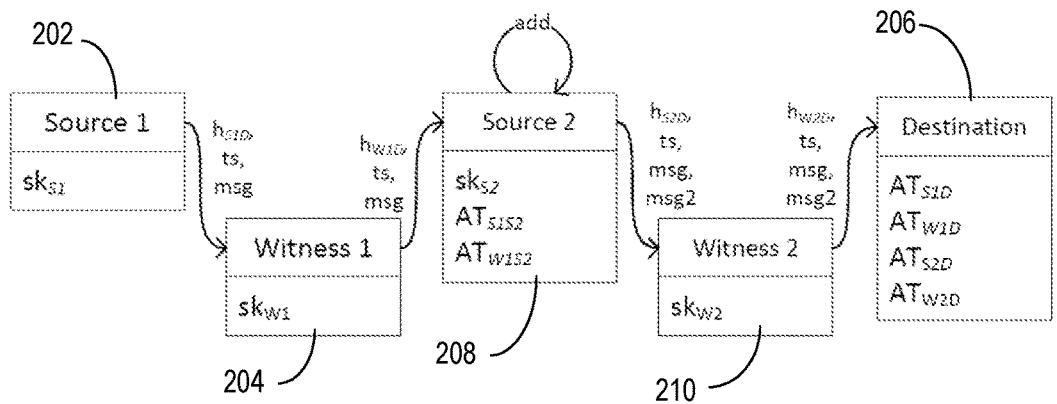
FIG. 2B shows a message flow in another example
application of a method of message validation in a system of
connected devices.

In the case with two sources as shown in FIG. 2B, the second source device 208 partially acts as a witness while concatenating a new (transformed) message and calculating the next ring of the chain. For instance, receiving the inputs "$h_{S1D}$, ts, msg" a witness would normally calculate its cryptographic evidence as follows: hash ($h_{S1D}$, hash ($sk_W$, $salt_{WD}$), ts, msg). Instead, in this example, the second source device 208 renders the hash as follows: $hs_{2D}$=hash ($h_{S1D}$, hash ($sk_{S2}$, $salts_{2D}$), ts, msg, msg2), extending the message. Then, it sends $hs_{2D}$, ts, msg, msg2 to the next node (in FIG. 2B, this is second witness 210). Consequently, Lines 5-6 are executed in the Algorithm IV.1, which increases the number of messages to be processed at Line 7.

Some embodiments may comprise verification by intermediate nodes, such that the upstream provenance can be authenticated before forwarding to downstream end field devices. Such a feature may be desirable at a boundary of the substation. For instance, a security device 150 associated with a substation gateway 126 may need to perform verification before forwarding messages inward, e.g. to an IED 130.1. In this case, the intermediate nodes may be configured to verify the upstream provenance first, then witness the message, and send it to the target IED 130.1. Such a case can be accommodated by treating the intermediate nodes as destination nodes.

Figure 2C:
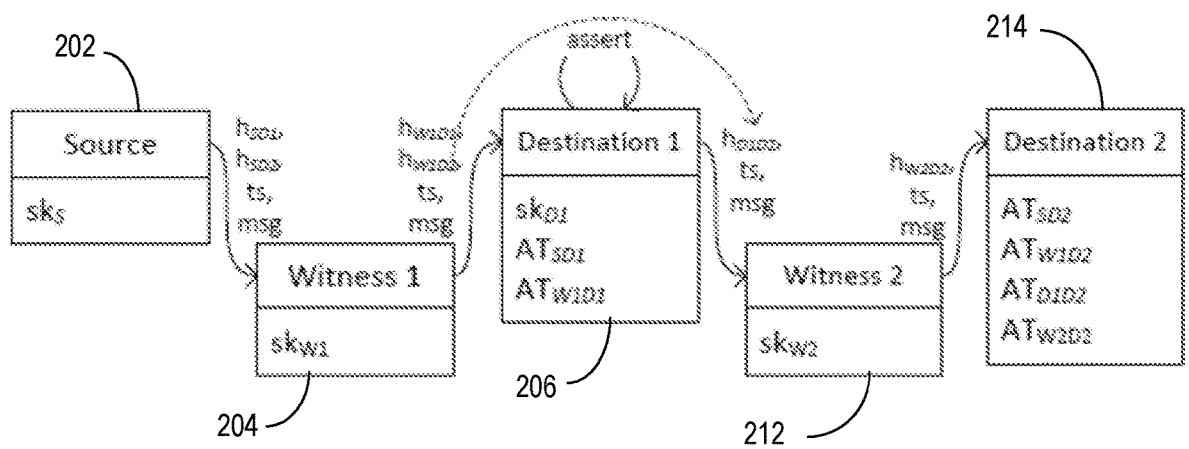
FIG. 2C shows a message flow in a further example
application of a method of message validation in a system of
connected devices.

FIG. 2C is an example flow having two destinations 206 and 214. As in the previous examples, the source node 202 may start the chain by an initiate operation. Since the message is targeted to two destinations 206 and 214, the initiate operation comprises the source 202 generating two proofs of provenance, one for destination node one ($h_{SD1}$) and one for destination node two ($h_{SD2}$). The witnesses 204 and 212 in between then perform respective witness operations to witness both of these cryptographic evidences. When the message arrives to the first destination 206, it runs Algorithm IV.1 for the cryptographic evidence intended for it ($h_{W1D1}$). Once first destination 206 verifies the authenticity of the message, it then proceeds to check its assertion. If the assertion is satisfied, destination 206 then forwards the message witnessing the cryptographic evidence intended for the second destination 214. The second destination 214 then runs Algorithm IV.1 for the cryptographic evidence it receives at the end ($h_{D1D2}$ if there is no witness in between, or the cryptographic evidence of the last witness).

As a variant of the case discussed above, it is also possible that an intermediate node has autonomy to control downstream nodes. For example, a data concentrator may perform message aggregation when reporting measurements from IEDs in the substation (Reporting by Field Device). In such cases, an intermediate node may be required first to authenticate incoming message(s) and then to send a new, derived message to the destination. This case may be considered to be a combination of parts of FIGS. 2A and 2B. First, the intermediate node 204 acts as the first destination and verifies the part of the incoming message that is intended for it, as in the example of FIG. 2B. Second, instead of witnessing the message that is passing through, it adds its own message, and transmits this to the destination 206.

Example algorithms for implementing methods according to certain embodiments will now be described. Notation used in the following description is explained in FIG. 4.

Below we denote the set of messages as "MSG". Subscripts are used to denote an element in this set and superscripts to denote the state of the set. The cryptographic evidence (h) is to be sent along with the plaintext timestamp (ts) and message.

Setup: $sk_S \leftarrow KeyGen(1^\kappa)$—Given the security parameter $\kappa$, a secret key (sk) is generated by every node in the system 100.

$AT_{SD} \leftarrow hash(sk_S, D)$—Every source node (S), given the secret key and a salt value, generates an authentication token (AT) per destination (D). It is assumed that destinations for each source is known in advance, which will be true for most cases given the well-defined and non-dynamic nature of ICS architectures, and it is also assumed all the ATs are distributed to the corresponding destinations in a secure manner.

$h_0$, MSG$\leftarrow$Initiate($sk_0$, ts, message, D)—Given the secret key, timestamp (ts), a message and the destination, outputs the first cryptographic evidence ($h_0$) of the chain and the set of messages with one message in—the later nodes in the path may add messages to the set (see "Extend" below).

$h_c \leftarrow$Witness($h_{c-1}$, D, $sk_c$, ts, MSG)—Given the previous node's cryptographic evidence, the destination, the secret key, timestamp and the set of messages, outputs a witness cryptographic evidence.

$h_c$, MSG'$\leftarrow$Extend($h_{c-1}$, D, $sk_c$, ts, message, MSG)—Given the previous node's cryptographic evidence $h_{c-1}$, the destination, the secret key, timestamp, a message and the set of previous messages, outputs an extension cryptographic evidence and the extended message set.

accept/reject$\leftarrow$Verify($h_c$, ts, AT, MSG)—Given the last node's cryptographic evidence ($h_c$), the timestamp, the set of authentication tokens (that consists of the authentication tokens of the source node and other nodes on the path) and the set of messages, outputs a bit (1 for verify, 0 for reject).

Embodiments of the present disclosure use a chain of keyed cryptographic digests. To create the chain, a function (e.g., cryptographic hash function, HMAC) is employed to map data of arbitrary size to data of fixed size. A one-way function that is collision resistant (e.g., SHA256) is used.

Let hash: $I_1 \times I_2 \to 0$ be a family of hash functions. A function is collision resistant if for all Probabilistic Polynomial Time (PPT) adversaries A, there exists a negligible function neg such that $P[(I_2, I'_2) \leftarrow A(I_1): I_2 \neq I'_2 \wedge (hash_{I_1}(I_2) = hash_{I_1}(I'_2))] \leq neg(n)$. Embodiments of the present disclosure use an HMAC construction employing SHA256, and this function is denoted as "hash" in the following. Each digest is derived from one previous digest in the chain. Further, in the following, the operator || denotes concatenation. In the present disclosure, hash($i_1, i_2, \ldots, i_m$) is equivalent to hash($i_1 || i_2 || \ldots || i_m$).

The correctness of the protocol according to embodiments is defined as:

$\forall$MSG$_1, \ldots,$ MSG$_m \in \{0,1\}^*$, if [$sk_S \leftarrow$KeyGen($1^K$) AND $AT_{SD} \leftarrow$hash($sk_S$, D) for D$\in$[1, ..., # of destinations per node]] for S$\in$[1, ..., # of nodes]; ($h_0$, MSG)$\leftarrow$Initiate ($sk_S$, ts, MSG$_1$, D); [$h_x \leftarrow$Witness($h_{x-1}$, D, $sk_x$, ts, MSG$_{current}$) OR ($h_x$, MSG$_y$)$\leftarrow$Extend($h_{x-1}$, D, $sk_x$, ts, MSG$_y$, MSG$_{y-1}$)] for x$\in$[1, ..., # of nodes on the path] and y$\in$[1, ...,# of sources on the path]; then Verify($h_x$, AT, MSG$_y$)=1 with probability 1. In short, as long as a secure hash function (e.g., HMAC-SHA256) is used, the present disclosure does not allow any forgery and tampering of the provenance chain.

Figure 5:
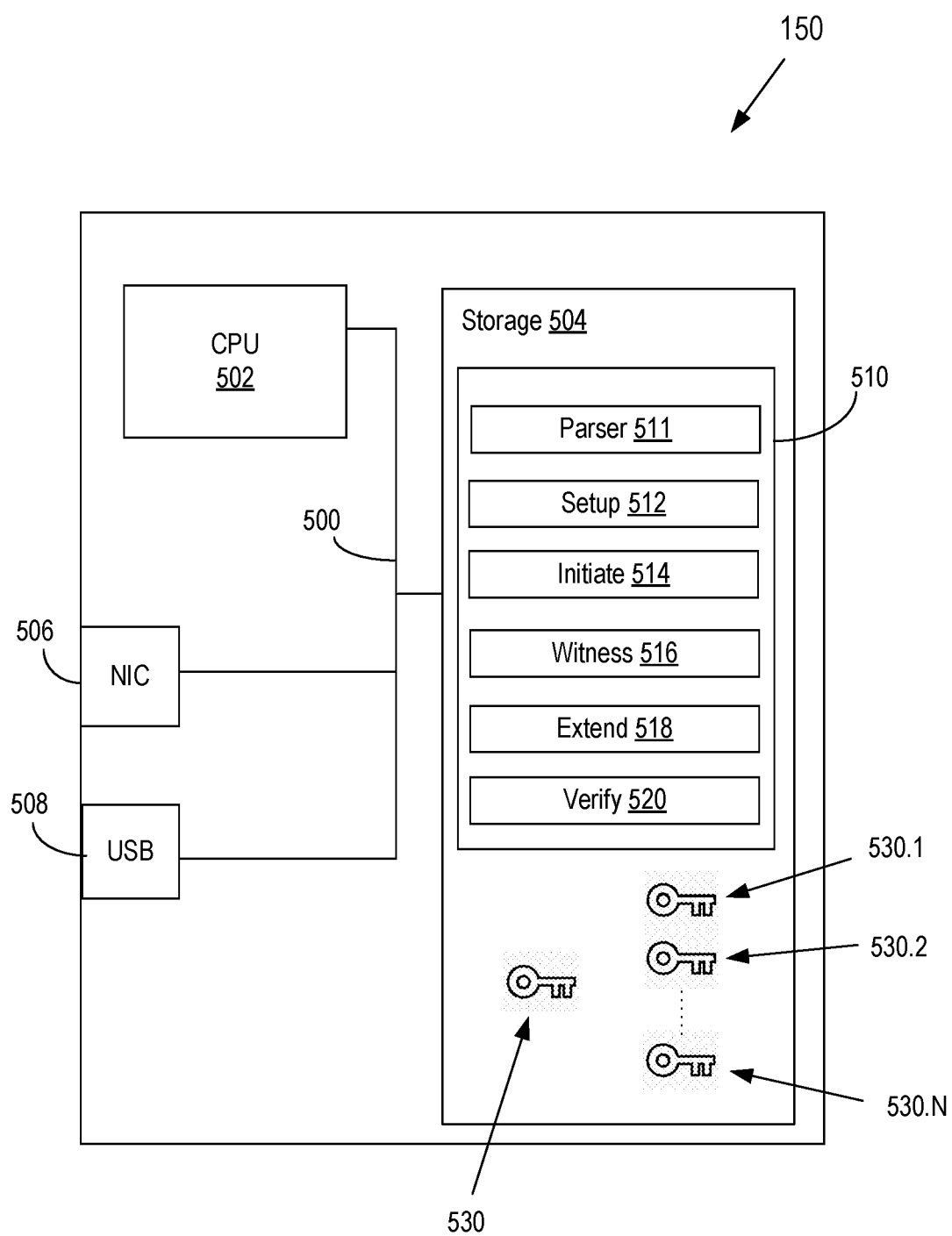
FIG. 5 is an example architecture of a security device for
message validation in a system of connected devices.

A high level architecture of an example security device 150 according to certain embodiments is shown in FIG. 5. In some embodiments, the security device 150 may be implemented on a BeagleBoard platform, such as BeagleBoard-X15. As mentioned above, in some embodiments, the functions of the security device 150 may be performed by key communication nodes of the system 100, such as HMI 128, PLC 140, VPN 122, RTU 124, or substation gateway 126. Accordingly, it will be understood that part or all of the processes described as being performed by security devices 150 may be implemented in software or firmware instructions that are executed by one or more processors of such communication nodes.

The security device 150 comprises at least one processor 502 that is in communication with at least one storage medium 504. The security device 150 also comprises at least one network interface component 506, such as an Ethernet interface, and optionally may comprise other interface components, such as USB interface 508. The at least one processor 502 may be in communication with storage 504, NIC 506 and USB 508 via a bus 500, for example.

The at least one storage medium 504 stores programming instructions of one or more software components or modules 510 to cause the at least one processor 502 to execute the processes and/or methods of the present disclosure. At least parts of the software modules 510 could alternatively be implemented as one or more dedicated hardware components, such as application-specific integrated circuits (ASICs) and/or field programmable gate arrays (FPGAs).

The at least one storage medium 504 also stores cryptographic data and functions for facilitating execution of the processes and/or methods of the present disclosure. For example, storage medium 504 may store a secret key 530 for the security device 150. Security device 150 may generate a plurality of derived keys (authentication tokens) 532.1, 532.2, . . . , 532.N for N other security devices 150 in the system 100, each of which is a destination node from the perspective of the security device 150, as described above. These may also be stored in storage medium 504. In some embodiments, keys 530 and 532.1, . . . , 532.N may be stored in a secure area of the storage medium 504, a separate secure storage medium, and/or in a Trusted Execution Environment (TEE) of a processor 502. In TEE-based implementations, at least some cryptographic functions may also be stored in the TEE for safe execution therein.

The security device 150 may comprise a plurality of standard software modules (not shown), including an operating system such as Linux, and one or more libraries that provide standard networking functionality. Additionally, the security device 150 may comprise the following modules:

A packet parser 511 that is responsible for transparently intercepting (or otherwise obtaining) packets that are incoming into or outgoing from the protected device to which the security device 150 is connected. Example implementations may use either iptables (in case IP-based protocols such as IEC 60870-5-104 and IEC 61850 MMS can be handled) or ebtables (for handling of IEC 61850 GOOSE), along with NFQUEUE to intercept or otherwise obtain packets of interest, extract the accompanying cryptographic evidence if any, and pass this to one or more other of the modules 510 for further processing or analysis. The parser 511 may also receive outputs from the other modules and compile an outgoing packet for transmission to other security devices 150 in the system 100. If the cryptographic evidence is not valid or any other issue is found, the packet may be dropped.

A setup module 512 that generates secret keys 530 and derived keys (authentication tokens) 530.1, . . . , 530.N, and distributes the derived keys 530.1, . . . , 530.N to other security devices 150.

An initiate module 514 that generates a cryptographic evidence for a message that has been sent by the device that the security device 150 is attached to, as described above.

A witness module 516 that alters the cryptographic evidence that is already attached to a message that is passing though the physical device that the security device 150 is attached to, as described above.

An extend module 518 that witnesses a message, but also adds further information, with the cryptographic evidence being altered accordingly, as described above.

A verify module 520 that checks the authenticity of a cryptographic evidence associated with a message intended to be received by a physical device to which the security device 150 is attached, and either accepts or rejects the evidence, as described above.

As shown, the modules 510 are implemented in the application layer, but it will be appreciated that in other embodiments, it is possible to implement one or more of the modules 150 in the kernel space for better performance. Further, one or more of the modules 510 may alternatively be implemented in a TEE of processor 502.

The boundaries between the modules and components in the software modules 510 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of the processes performed by the security device 150 may be executed by a module (of software modules 510) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

The security device 150 normally processes information according to a program (a list of internally stored instructions such as a particular application program and/or an operating system) and produces resultant output information, for example via input/output (I/O) devices such as NIC 506. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Evaluation of a security method according to certain embodiments will now be described. The evaluation was performed on a BeagleBoard-X15 device configured to execute the security method. The time overhead includes the time spent on cryptographic hash calculations, other packet-processing operations, and the end-to-end delay when deploying the present implementation in a smart-grid-alike network environment. The hash functions and key sizes were varied, and the time overhead incurred in these variants was compared with the overhead of the public-key encryption scheme of RSA. The message size overhead and throughput were also assessed.

Figure 6A:
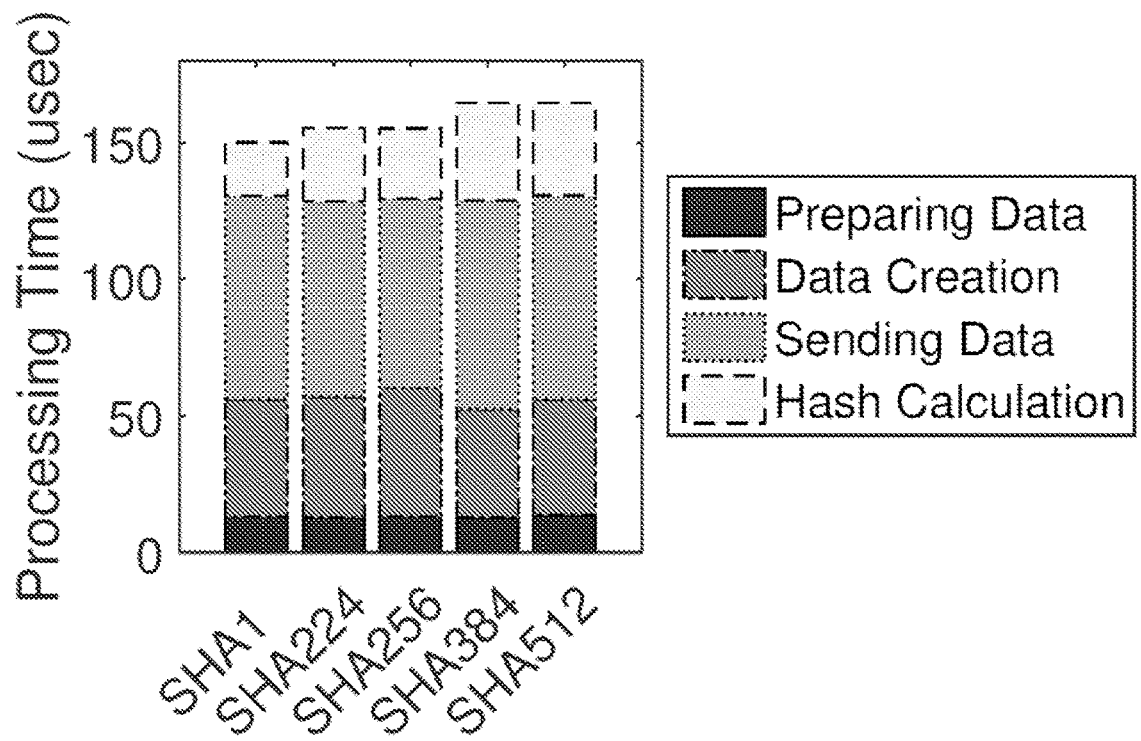
FIG. 6A shows processing time of an initiate operation in
a method for message validation according to certain
embodiments.
Figure 6B:
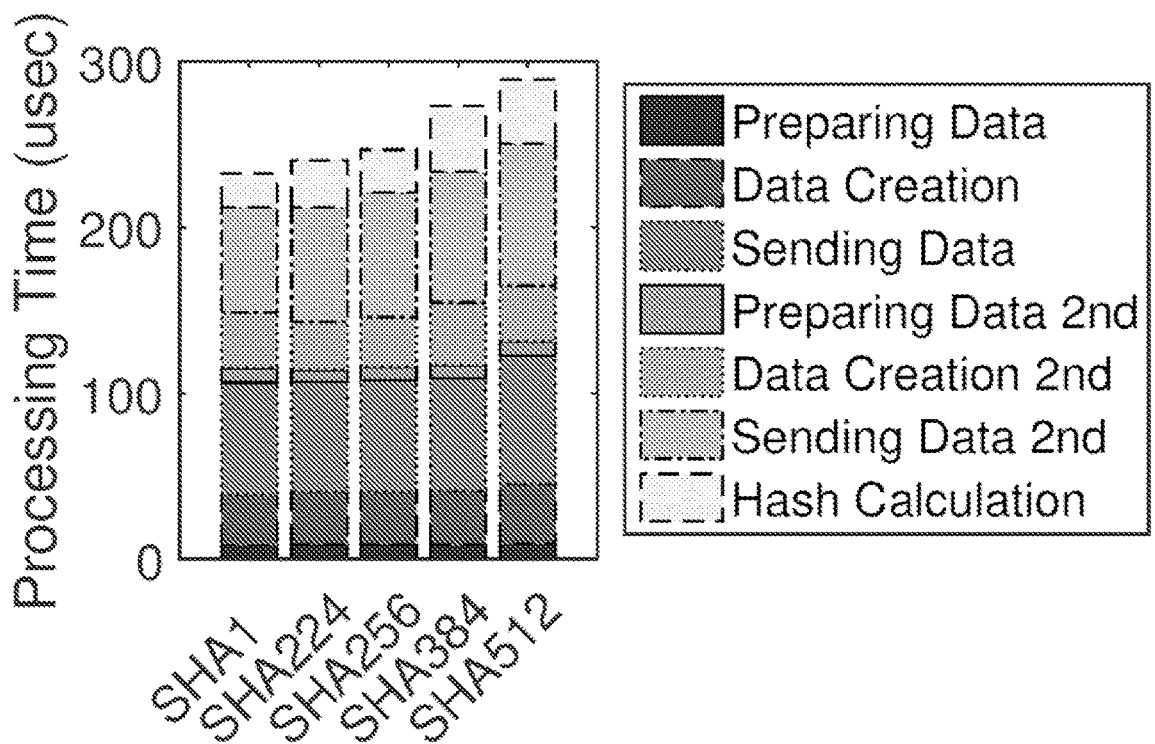
FIG. 6B shows processing time of a witness operation in
a method for message validation according to certain
embodiments.

Time spent on cryptographic hash calculations and other packet processing operations: FIG. 6A and FIG. 6B show the breakdown of the time spent for each operation during Initiate and Witness respectively. The performance overhead for Extend is similar to Witness, and is thus omitted. As can be seen, the time spent on the cryptographic hash operation is very short (i.e. less than 40 microseconds even for HMAC construction with SHA512), even when implemented on a low-cost embedded device. In fact, it only constitutes a small fraction of the overall packet processing latency. Other necessary operations (such as preparing, creating, and sending the data packets) take significantly longer than the hash operations. Note that Initiate takes less time than Witness. This is because Initiate only processes a packet once, while Witness needs to receive/process/send a packet twice—first for the incoming packet to its associated smart grid device, and again for the processed packet leaving the associated device.

Figure 6C:
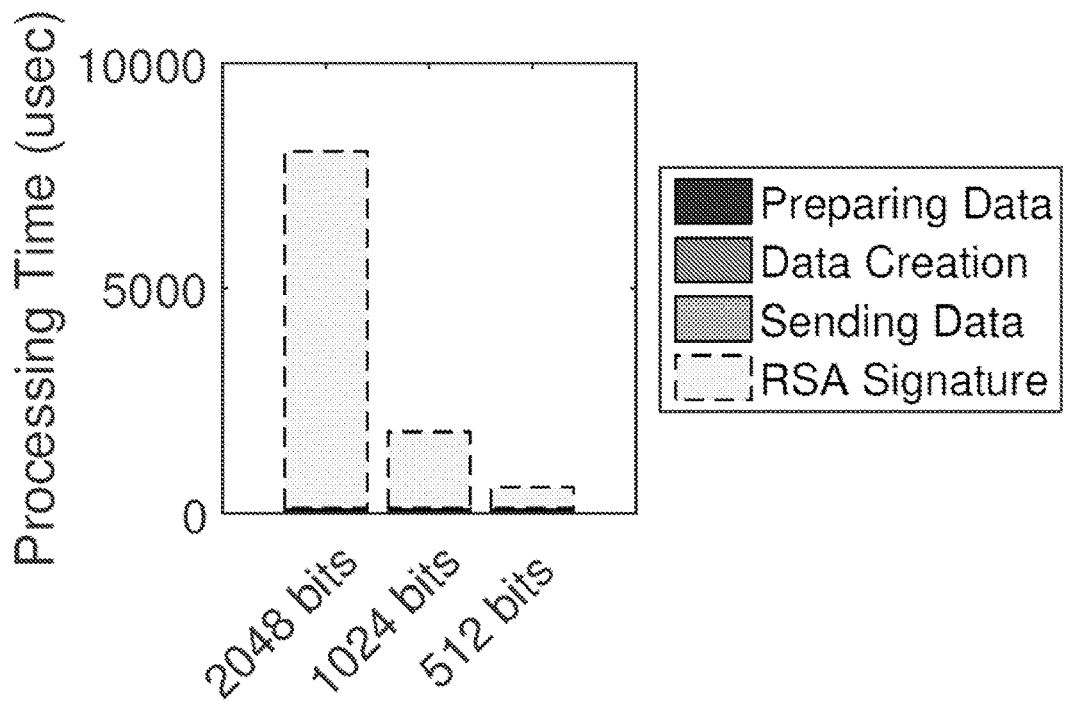
FIG. 6C shows processing time for computing RSA-based
signatures.

In comparison, FIG. 6C shows the overheads for signing a packet using RSA signatures. We have employed openSSL library to sign the same amount of data that was required for the Initiate and Witness results shown in FIGS. 6A and 6B. With the key size of 2048 bits—which is the minimum of the ones considered secure—and with SHA256 as the digest function, the signing operation alone takes 8 ms and dominates the other packet processing operations. Thus, it is clearly apparent that RSA signatures are not suitable for use in time stringent operations.

Figure 6D:
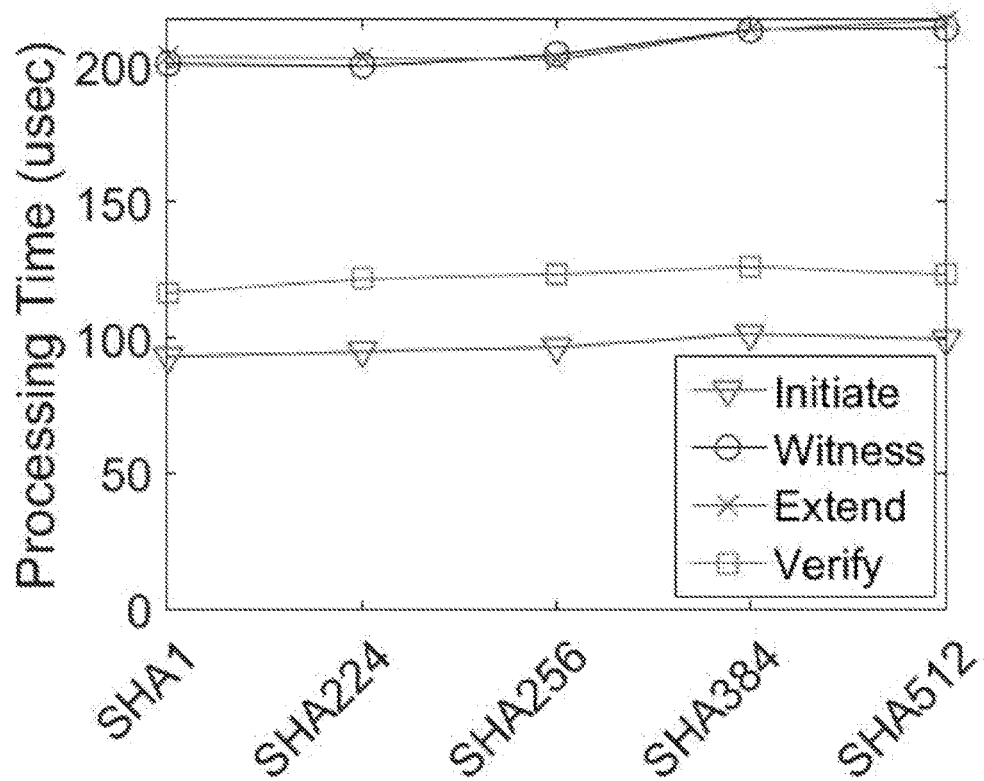
FIG. 6D shows overall time spent for various operations
in a method of message validation according to certain
embodiments that use different hash functions.

FIG. 6D shows the time spent for all the four core operations (Initiate, Witness, Extend, Verify) on Beagle-Board. As shown in FIG. 6D, the time overhead of these operations remains low regardless of the hash function employed.

Figure 6E:
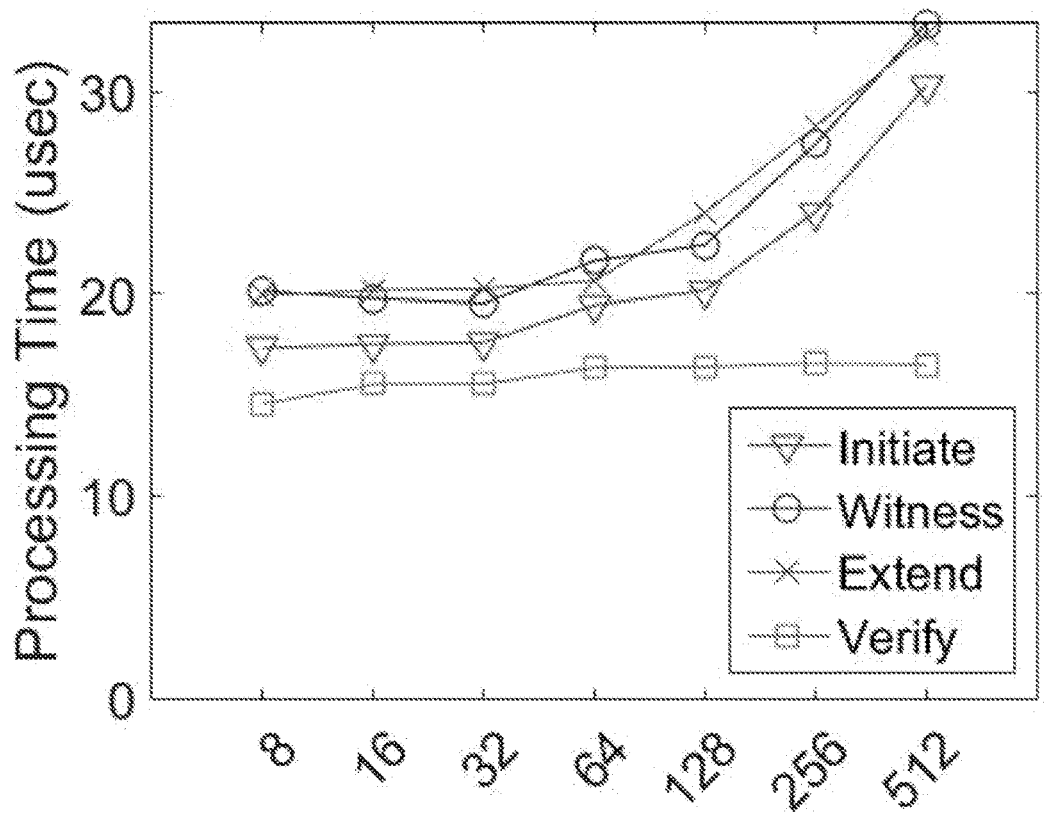
FIG. 6E shows overall time spent for the hashing step in
a method of message validation according to certain
embodiments, for different key sizes.

FIG. 6E shows the time spent for the hashing operations for the cryptographic evidence or the verification using different key sizes. In the present implementation, the AT is stored by the destination security device, so the time spent for verification does not change with the key size. The other three operations compute ATs on the fly using the secret keys, hence the time consumed increases with the key size.

Figure 6F:
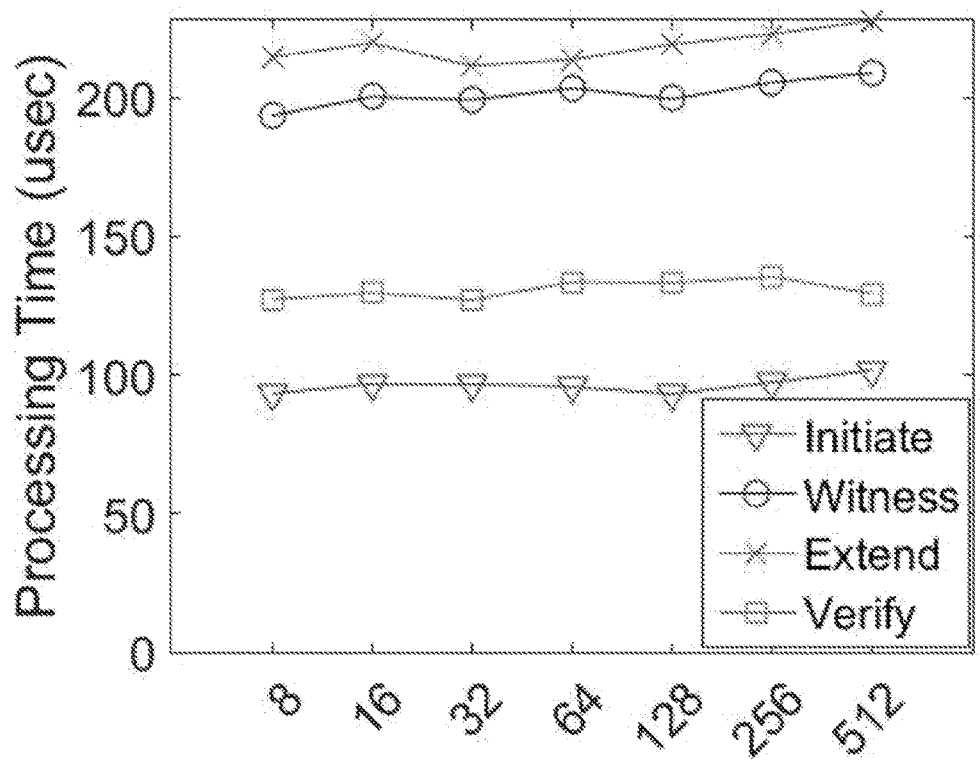
FIG. 6F shows overall time spent for various operations
in a method of message validation according to certain
embodiments, for different secret key sizes.

FIG. 6F shows the overall time spent to perform each operation for different key sizes. Again, there is little increase in the overall time overhead with the increase of the secret keys utilized. Overall, the latency is short enough when used with practically-secure key size and hash function.

Communication overhead: The communication overhead is very minimal at 320 bits (h: 256 bits in the case of SHA256 and ts: 64 bits) per packet, and most importantly its size remains the same regardless of the hop count.

Figure 6G:
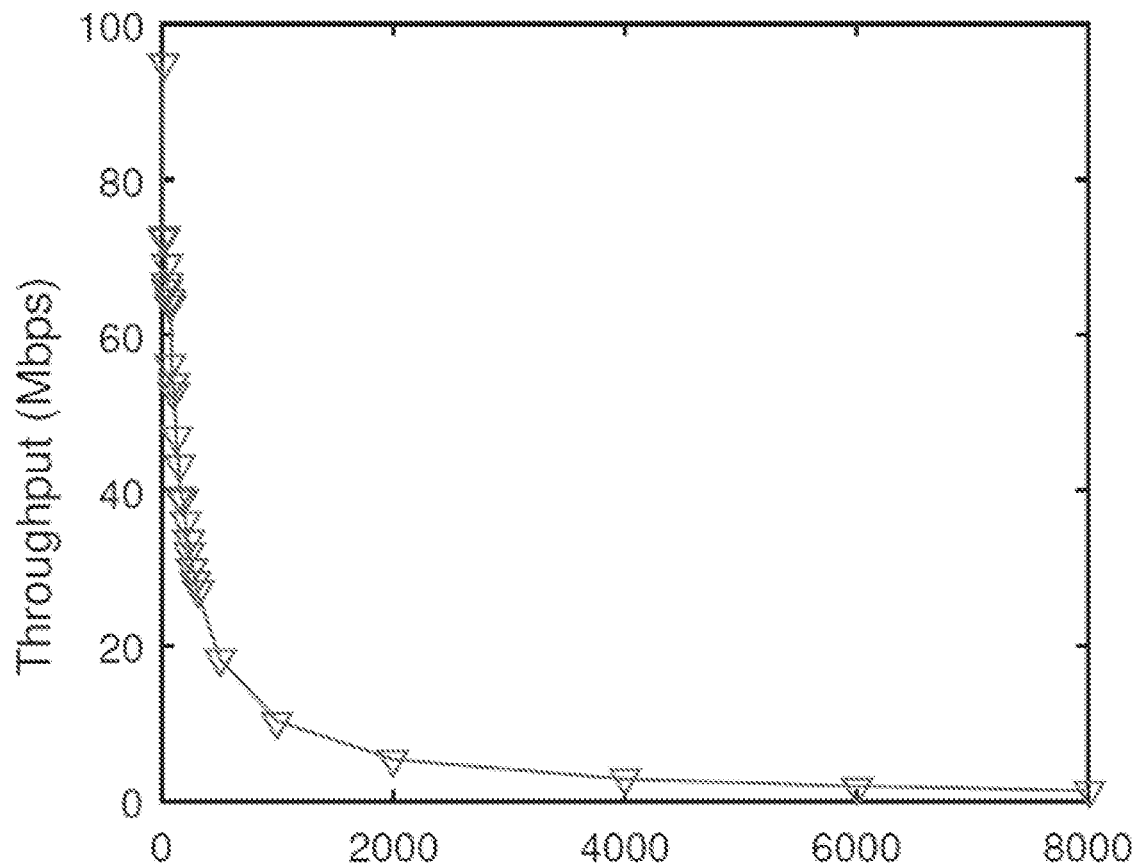
FIG. 6G shows the effect of computation (in usec) per
packet to the throughput of a security device according to
certain embodiments.

Throughput measurements: We have measured the throughput on BeagleBoard. FIG. 6G shows throughput measurements using iperf over TCP with message size 1514 Bytes and with different computational latency added on BeagleBoard. The initiate operation on the BeagleBoard takes 140-160 usec as shown in FIG. 6A. Therefore, as seen in FIG. 6G, the present method on BeagleBoard can support 39.5 MBits/s at a source security device. And, the witness operation takes 280-300 usec as shown in FIG. 6B, therefore the BeagleBoard can support 27 MBits/s at an intermediate device. This translates to 3420 packets per second for the initiate operation. The computation time needed for verify operation and to support multicast can be longer, but the present method can still sustain about 866 packets per second throughput when each packet incurs an extra 1 ms of computation time. In addition, our packet throughput measurement is a conservative lower bound since the packet sizes in both IEC 61850 MMS and GOOSE are usually smaller than 1514 Bytes. Therefore, the throughput on BeagleBoard is sufficient for typical traffic intensity.

End-to-end latency overhead: To measure end-to-end latency overhead introduced by the present method, we set up a system with multiple hops using virtual machines. The total time overhead introduced is shown in the table below.

| 1 hop | 2 hops | 3 hops | 4 hops | 5 hops |
|---|---|---|---|---|
| <0.7 ms | <1.7 ms | <2.6 ms | <3.5 ms | <4.5 ms |

The overhead is measured as the difference between the original end-to-end latency of a system without security devices 150 and that of a system 100 where security device 150 is attached to each device along the path. While the 1-hop case only involves security devices 150 initiating and verifying, the other cases involve intermediate nodes witnessing. The overall latency for the 1-hop case, which corresponds to the most latency-stringent scenarios, is low enough to meet a 2 ms message delivery time. The cases with more than three hops are for SCADA communication and the time requirement is not as strict as those with one or two hops, and the added latency is not significant.

Compatibility testing: We tested our implementation on the Electric Power and Intelligent Control (EPIC) testbed (A. Siddiqi, N. O. Tippenhauer, D. Mashima, and B. Chen, "On practical threat scenario testing in an electric power ics testbed," in Proceedings of the Cyber-Physical System Security Workshop (CPSS), co-located with ASIACCS, June 2018). EPIC is a smart power grid testbed (open to external access), which includes generation, transmission, microgrid, and smart home components. Each of the four segments of EPIC has its PLCs, IEDs, and communication systems in a fiber optic ring network. EPIC testbed utilizes IEC 61850 MMS and GOOSE protocols. We connected our BeagleBoard implementation of security device 150 into the generation segment of the testbed for adding and verifying the cryptographic evidence as discussed above. We demonstrated compatibility with the smart grid devices and network in the testbed for both IEC 61850 MMS and GOOSE communication.

Many modifications will be apparent to those skilled in the art without departing from the scope of the present invention.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A security device for provenance verification, the security device comprising:
   at least one processor; and
   machine-readable storage having stored thereon:
   a secret key;
   a plurality of shared keys derived from the secret key, each shared key being associated with a pair consisting of the security device and one of a plurality of other security devices; and
   instructions for causing the at least one processor to:
   generate, and/or receive, a message from a device with which the security device is in communication, or from one of the plurality of other security devices; and
   perform at least one cryptographic operation on the message, and/or on data derived from the message, using the secret key and/or one of said shared keys, the at least one cryptographic operation comprising one of a witness operation and an extend operation, comprising:
   receiving a cryptographic evidence, a timestamp, and the message from a first device of said other security devices;
   determining a second device of said other security devices to which the message will be sent;
   responsive to the cryptographic operation being the witness operation:
   generating a modified cryptographic evidence from a function of the cryptographic evidence, the shared key of the pair consisting of the security device and the second device, the timestamp, and the message; and
   transmitting the modified cryptographic evidence, the timestamp, and the message to the second device; or
   responsive to the cryptographic operation being the extend operation:
   generating a modified cryptographic evidence from a function of the cryptographic evidence, the shared key of the pair consisting of the security device and the second device, the timestamp, the message, and a further message; and
   transmitting the modified cryptographic evidence, the timestamp, the message, and the further message to the second device.

2. The security device according to claim 1, wherein each shared key is derived by generating a hash of the secret key and a salt value that is specific to the pair.

3. The security device according to claim 2, wherein the at least one cryptographic operation comprises generating at least one hash from one or more of: the secret key, one or more of said shared keys, one or more of said salt values, the message, and a timestamp.

4. The security device according to claim 1, wherein the at least one cryptographic operation comprises an initiate operation that comprises:
   determining a destination device of said other security devices to which the message will be sent;
   generating cryptographic evidence that comprises a hash of: the shared key of the pair consisting of the security device and the destination device; a timestamp value; and the message; and
   transmitting the cryptographic evidence, the timestamp value, and the message to the destination device.

5. The security device according to claim 1, wherein the at least one cryptographic operation comprises the witness operation and
   generating the modified cryptographic evidence comprises generating the modified cryptographic evidence comprising a hash of the cryptographic evidence, the shared key of the pair consisting of the security device and the second device, the timestamp, and the message.

6. The security device according to claim 1, wherein the at least one cryptographic operation comprises the extend operation and
   generating the modified cryptographic evidence comprises generating the modified cryptographic evidence comprising a hash of the cryptographic evidence, the shared key of the pair consisting of the security device and a destination device being another security device from the plurality of security devices, the timestamp, the message, and a further message.

7. The security device according to claim 1, wherein the at least one cryptographic operation comprises a verification operation that comprises:
   receiving a cryptographic evidence, a timestamp, and one or more messages, said one or more messages arriving at the security device through a sequence of said other security devices;
   generating a hash for each successive device in the sequence, each successive hash being computed based on: the hash for the previous device in the sequence, the shared key for the pair that consists of the successive device and the previous device, the timestamp, and if applicable, one of the one or more messages; and
   comparing a last one of said hashes to the cryptographic evidence.

8. A networked system comprising:
   a plurality of connected devices,
   wherein a subset of the connected devices is a plurality of security devices, each security device being a security device according to claim 1, forming a pair with another said security device from the plurality of security devices, and being provided with a key set comprising: the secret key, and the plurality of shared keys, each shared key being derived by generating a hash of the secret key and a salt value that is specific to the pair.

9. The networked system according to claim 8, wherein the networked system is an industrial control system or a smart grid.

10. A method of provenance verification, comprising:
    providing a plurality of security devices, each said security device from the plurality of security devices forming a pair with another said security device from the plurality of security devices, and being provided with a key set comprising: a secret key, and a plurality of shared keys, each shared key being derived by generating a hash of the secret key and a salt value that is specific to the pair; and
    configuring each security device to:
    generate and/or receive one or more messages; and
    perform at least one cryptographic operation on the one or more messages, and/or on data derived from the one or more messages, using a respective secret key of the security device and/or one of said shared keys, the at least one cryptographic operation comprising one of a witness operation and an extend operation, comprising:
    receiving a cryptographic evidence, a timestamp, and the message from a first device of said other security devices;

determining a second device of said other security devices to which the message will be sent;

responsive to the cryptographic operation being the witness operation:

generating a modified cryptographic evidence from a function of the cryptographic evidence, the shared key of the pair consisting of the security device and the second device, the timestamp, and the message; and transmitting the modified cryptographic evidence, the timestamp, and the message to the second device; or responsive to the cryptographic operation being the extend operation:

generating a modified cryptographic evidence from a function of the cryptographic evidence, the shared key of the pair consisting of the security device and the second device, the timestamp, the message, and a further message; and transmitting the modified cryptographic evidence, the timestamp, the message, and the further message to the second device.

11. The method according to claim 10, wherein the at least one cryptographic operation comprises generating at least one hash from one or more of: the respective secret key, one or more of said shared keys, one or more of said salt values, the message, and a timestamp.

12. The method according to claim 10, wherein for each said security device, the at least one cryptographic operation comprises an initiate operation that comprises:

determining a destination device from the plurality of security devices, to which the message will be sent;

generating a cryptographic evidence that comprises a hash of the shared key of the pair consisting of the security device and the destination device, a timestamp value, and the message; and transmitting the cryptographic evidence, the timestamp value, and the message to the destination device.

13. The method according to claim 10, wherein the at least one cryptographic operation comprises the witness operation and generating the modified cryptographic evidence comprises generating the modified cryptographic evidence that comprises a hash of the cryptographic evidence, the shared key of the pair consisting of the security device and the second device, the timestamp, and the message.

14. The method according to claim 10, wherein the at least one cryptographic operation comprises the extend operation and generating the modified cryptographic evidence comprises generating the modified cryptographic evidence that comprises a hash of the cryptographic evidence, the shared key of the pair consisting of the security device and the second device, the timestamp, the message, and a further message.

15. The method according to claim 10, wherein the at least one cryptographic operation comprises a verification operation that comprises:

receiving a cryptographic evidence, a timestamp, and one or more messages from a first device of said other security devices, said one or more messages arriving through a sequence of said other security devices;

generating a hash for each successive device in the sequence, each successive hash being computed based on the hash for the previous device in the sequence, the shared key for the pair that consists of the successive device and the previous device, the timestamp, and if applicable, one of the one or more messages; and comparing a last one of said hashes to the cryptographic evidence.

16. The method according to claim 10, comprising connecting the security devices to a network such that the security devices intercept or otherwise obtain traffic between a plurality of connected devices on the network, wherein the one or more messages comprise data derived from said traffic.

17. The method according to claim 16, wherein the network is a network of an industrial control system or a smart grid.

* * * * *